US012794066B2

(12) United States Patent
Chen et al.

(10) Patent No.: US 12,794,066 B2
(45) Date of Patent: Nov. 10, 2026

(54) BATTERY LOCKING MECHANISMS

(71) Applicant: HONEYWELL INTERNATIONAL INC., Charlotte, NC (US)

(72) Inventors: Chaobin Chen, Charlotte, NC (US); Zhihua Dai, Charlotte, NC (US); Yazhou Liu, Charlotte, NC (US); Shu Tan, Charlotte, NC (US); Haibin Du, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 790 days.

(21) Appl. No.: 18/045,327

(22) Filed: Oct. 10, 2022

(65) Prior Publication Data

US 2023/0124646 A1 Apr. 20, 2023

(30) Foreign Application Priority Data

Oct. 15, 2021 (CN) ......................... 202111205066.0

(51) Int. Cl.
*H01M 50/247* (2021.01)
*H01M 50/262* (2021.01)

(52) U.S. Cl.
CPC ....... *H01M 50/247* (2021.01); *H01M 50/262* (2021.01)

(58) Field of Classification Search
CPC .......................... H01M 50/247; H01M 50/262
USPC ...................................................... 429/96, 97
See application file for complete search history.

(56) References Cited

U.S. PATENT DOCUMENTS

| | | | | |
|---|---|---|---|---|
| 7,758,996 B2 * | 7/2010 | Mackle et al. ...... | H01M 50/247 429/96 |
| 8,094,439 B2 | 1/2012 | Lin | |
| 2023/0208952 A1 * | 6/2023 | Yan et al. ........... | H04M 1/0262 361/679.01 |

FOREIGN PATENT DOCUMENTS

EP 1427035 A1 6/2004

OTHER PUBLICATIONS

EP Office Action Mailed on Feb. 17, 2025 for EP Application No. 22200333, 5 page(s).
Extended European Search Report for EP Application No. 22200333.7 mailed Feb. 2, 2023 (10 pages).
Intention to grant Mailed on May 29, 2026 for EP Application No. 22200333, 6 page(s).

* cited by examiner

*Primary Examiner* — Kevin P Kerns
(74) *Attorney, Agent, or Firm* — Alston & Bird LLP

(57) ABSTRACT

Devices, assemblies, and associated methods are provided for mobile devices. An example mobile device includes a body defining a first surface, a second surface opposite the first surface, and a cavity at the second surface that receives a battery therein. The mobile device includes a locking mechanism coupled with the cavity of the body that moves between an unlocked position and a locked position at which the locking mechanism secures the battery within the cavity in an instance in which the battery is received by the cavity. The cavity and the locking mechanism are configured to prevent a contact between the battery and the locking mechanism that results in movement of the locking mechanism from the locked position to the unlocked position.

10 Claims, 12 Drawing Sheets

BATTERY LOCKING MECHANISMS

CROSS-REFERENCE TO RELATED APPLICATIONS

This application claims priority pursuant to 35 U.S.C. 119(a) to Chinese Application No. 202111205066.0, filed Oct. 15, 2021, which application is incorporated herein by reference in its entirety.

TECHNOLOGICAL FIELD

Example embodiments of the present disclosure relate generally to mobile devices and, more particularly, to devices, systems, assemblies, and methods for providing a locking mechanism for securing a battery within a mobile device.

BACKGROUND

Mobile devices, such as personal digital assistants (PDAs), mobile phones, laptops, scanners, etc., may use batteries to supply power to these devices such that these devices may perform their intended operations. Furthermore, these mobile devices may be deployed in a variety of environments or industries in which the devices may be placed, handled, dropped, or the like. The inventors have identified numerous deficiencies with these existing technologies in the field, the remedies for which are the subject of the embodiments described herein.

BRIEF SUMMARY

Apparatuses, devices, systems, assemblies, and associated methods of assembling/manufacturing are provided for mobile devices. An example mobile device may include a body that defines a first surface, a second surface opposite the first surface, and a cavity defined in the body at the second surface and configured to receive a battery therein. The mobile device may include a locking mechanism coupled with the cavity of the body. The locking mechanism may be configured to move between an unlocked position and a locked position. In the locked position, the locking mechanism may be configured to secure the battery within the cavity in an instance in which the battery is received by the cavity. The cavity and the locking mechanism may be configured to prevent a contact between the battery and the locking mechanism that results in movement of the locking mechanism from the locked position to the unlocked position.

In some embodiments, the locking mechanism may further include a latch configured to, in the locked position, be received by a corresponding notch defined by the battery.

In some further embodiments, the latch may be configured to translate relative to the body from the locked position at which the latch projects at least partially into the cavity and the unlocked position at which the latch is at least partially retracted from the cavity.

In other embodiments, the cavity may be dimensioned to limit movement of the battery in a first plane. The first plane may be substantially parallel with respect to at least one of the first surface or the second surface.

In some further embodiments, in the locked position, the latch may be configured to limit movement of the battery in a second plane. The second plane may be substantially perpendicular with respect to the first plane.

In other further embodiments, in the locked position, the latch may be configured project in the first plane into the corresponding notch of the battery such that a first distance is defined between an end of the latch and the battery in the first plane.

In some still further embodiments, the cavity may be dimensioned to limit movement of the battery in the first plane toward the latch to a second distance where the second distance is less than the first distance.

In some embodiments, the mobile device may further include a battery cover removably attached to the second surface of the body and configured to cover the cavity.

In some embodiments, the cavity may define a first end supporting the locking mechanism such that, in the locked position and in an instance in which the battery is received by the cavity, the locking mechanism engages a corresponding first end of the battery.

In some further embodiments, the cavity may define a second end opposite the first end, the second end defining one or more extensions configured to, in an instance in which the battery is received by the cavity, engage a second end of the battery opposite the first end of the battery.

In some other further embodiments, the locking mechanism may further include a pair of latches supported by the first end of the cavity and configured to, in the locked position, collectively engage a corresponding notch defined by the battery.

In some still further embodiments, the locking mechanism may further include a pair of latch covers configured to attach respective latches to the body proximate the first end of the cavity.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

Mobile Device and Battery Locking Mechanism

Figure 1A:
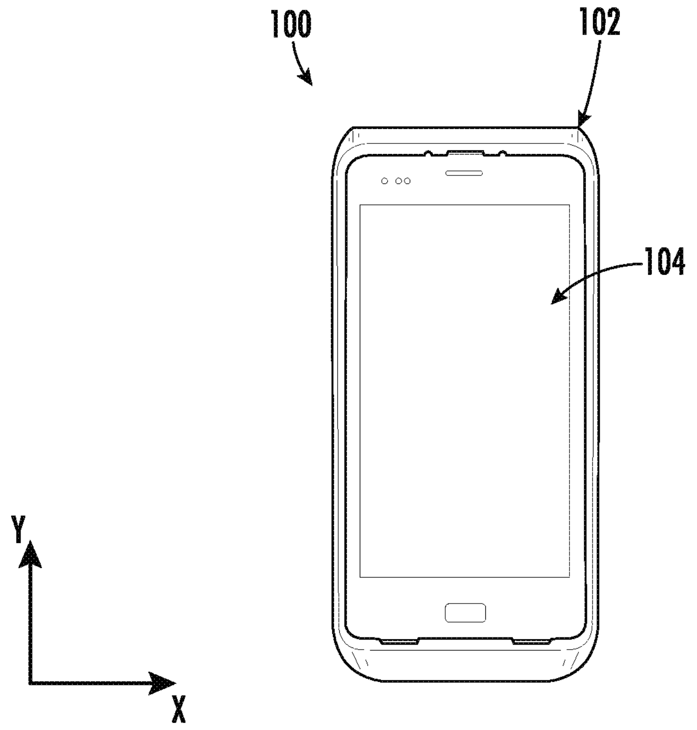
FIGS. 1A-1B illustrate perspective views of an example mobile device of the present disclosure according to an example embodiment.
Figure 1B:
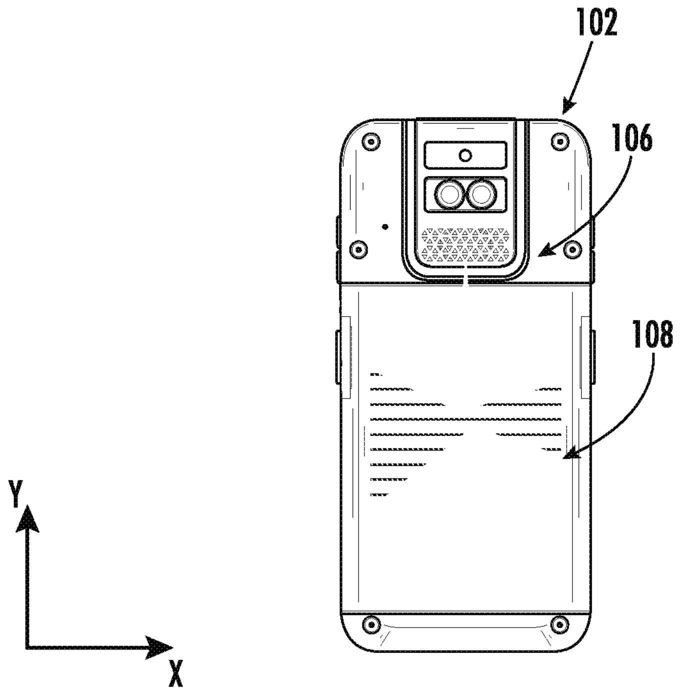

As described above, mobile devices such as personal digital assistants (PDAs), mobile phones, laptops, scanners, wearable devices, tablets, etc., may use batteries to supply power to these devices so that these devices may perform their intended operations. For example, PDAs may be deployed in a variety of industries (e.g., warehouses, manufacturing facilities, delivery services, etc.) in order to provide various functionalities (e.g., scanning transmission/receipt of data, computing, and/or the like) for an associated operator. As shown in FIGS. 1A-1B, for example, a mobile device 100 is illustrated that may include a screen (e.g., on the first surface 104 as described hereafter) that presents various forms of data to the operator and may further include a battery cover (e.g., battery cover 108 as described hereafter) that encloses a battery within the mobile device 100. Such a battery may power various processors, circuitry components, and/or the like of the mobile device 100. During operation, however, these mobile devices may be mishandled, dropped, or otherwise subjected to forces that may result in ejection of the battery from the mobile device.

Figure 2A:
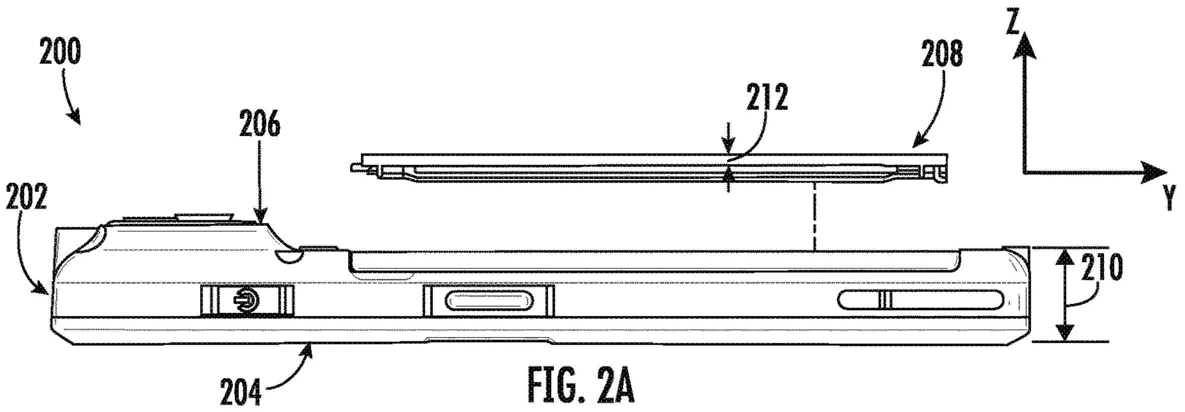
FIG. 2A PRIOR ART
FIG. 2A illustrates a side view of a prior art mobile device.

Traditionally, as described above, a battery cover (e.g., battery cover 108) may be used to enclose or otherwise cover a battery within the mobile device to attempt to prevent ejection of the battery during operation. Operators, however, have become increasingly interested in minimizing the size of mobile devices to provide a device that is thinner (e.g., having a reduced cross-section) and, thus, easier to handle, store, etc. With reference to FIG. 2A, a prior art mobile device 200 is illustrated with a body 202, a first surface 204, and a second surface 206. The thickness 210 of the body 102 may be greater than an associated thickness 110 of the body 102 of the mobile device 100 of the present disclosure. As the overall thickness 210 of the mobile device of FIG. 2A is reduced to, for example, a smaller overall thickness 110 of FIG. 2B, a thickness 212 associated with the battery cover 208 may be similarly reduced to a thickness 112 as shown. In doing so, the reduction in thickness (e.g., a reduction from thickness 212 to thickness 112) may reduce the effectiveness of the battery cover alone in retaining a battery within the mobile device.

Conventional attempts at solving this issue and others have relied upon various adhesives to secure the battery within the mobile device. For example, various conventional mobile devices places glues, adhesive tapes, etc. on one or more of an interior surface of the mobile device or the battery cover to attempt to secure the battery within the device. These attempts, however, prevent an operator from easily replacing a battery of the mobile device in that adhesives must be removed and reapplied before securing the battery within the device. Often, these conventional attempts require a separate repair service or system to properly remove the battery and replace a new battery within the mobile device with applicable adhesives resulting in increased downtime for the mobile device and, by association, reduced output by the associated operator. Furthermore, these conventional mobile devices that attempt to provide a thinner solution fail to sufficiently secure the battery within the mobile device resulting in unintended ejection of the battery during operation. Said differently, conventional attempts to provide battery security within a mobile device with a reduced cross-sectional area (e.g., a thinner solution) fail to properly prevent ejection of a battery during operation (e.g., in response to a dropped mobile device or otherwise).

In order to address these problems and others, the embodiments of the present disclosure may implement a locking mechanism attached or otherwise supported by the body of the mobile device that engages a battery received by a cavity of the mobile device. The cavity and locking mechanism of the present disclosure described herein may be configured to prevent a contact between the battery and the locking mechanism that results in movement of the locking mechanism from the locked position to the unlocked position to further prevent unintended ejection of the battery during operation. For example, the locking mechanism described herein may include a latch that, in a locked position, projects at least partially into a corresponding notch of a battery. The distance between the latch and the battery and the dimensions of the cavity may be configured to prevent any contact between the battery and the latch that would result in causing the latch (e.g., a portion of the locking mechanism) to move to an unlocked position. Said differently, the cavity may be dimensioned such that movement of the battery within the cavity in a direction towards the latch is limited to a distance that is less than the distance between the latch and the notch of the battery in this direction (e.g., movement of the battery cannot contact the latch).

With reference to FIGS. 1A-1B, an example mobile device 100 of the present disclosure is illustrated. As shown, the mobile device 100 may include a body 102, a first surface 104, and a second surface 106 opposite the first surface 104. As described above, the body 102 may support various circuitry components (not shown), such as processors, speakers, cameras, scanners, and/or the like based upon the intended application of the mobile device 100. Said differently, the mobile device 100 may be configured for use in any industry, environment, or application without limitation and may include any number of associated components, elements, computing devices, processors, etc. in order to perform the operations associated with the associated industry, environment, or application. As such, the first surface 104 may include one or more input elements (not shown), such as buttons, knobs, dials, touch screen features, or the like, to allow interaction with the mobile device 100 by the operator. By way of a non-limiting example, the mobile device 100 may include or otherwise be operable with various device platforms such as a Honeywell CT40 XP, CT60XP, CT40, CK65, Dolphin CN80, DolphinCT60, FlexDock Modular Docking System, ScanPal EDA51, ScanPal EDA61K, or ScanPal EDA71 platform. Although described herein with reference to an example mobile device 100, the present disclosure contemplates that the battery locking mechanisms described herein may be applicable to any device that receives a battery without limitation.

Figure 2B:
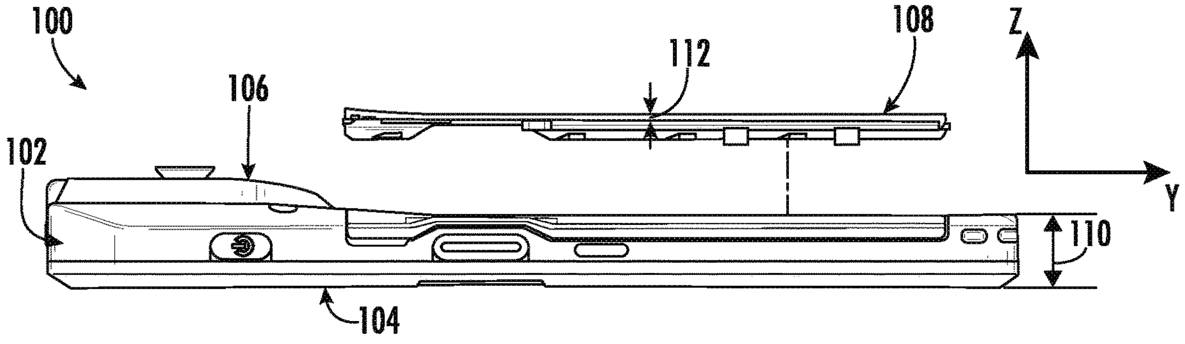
FIG. 2B illustrates a side view of the example mobile device of FIGS. 1A-1B, according to an example embodiment.
Figure 3:
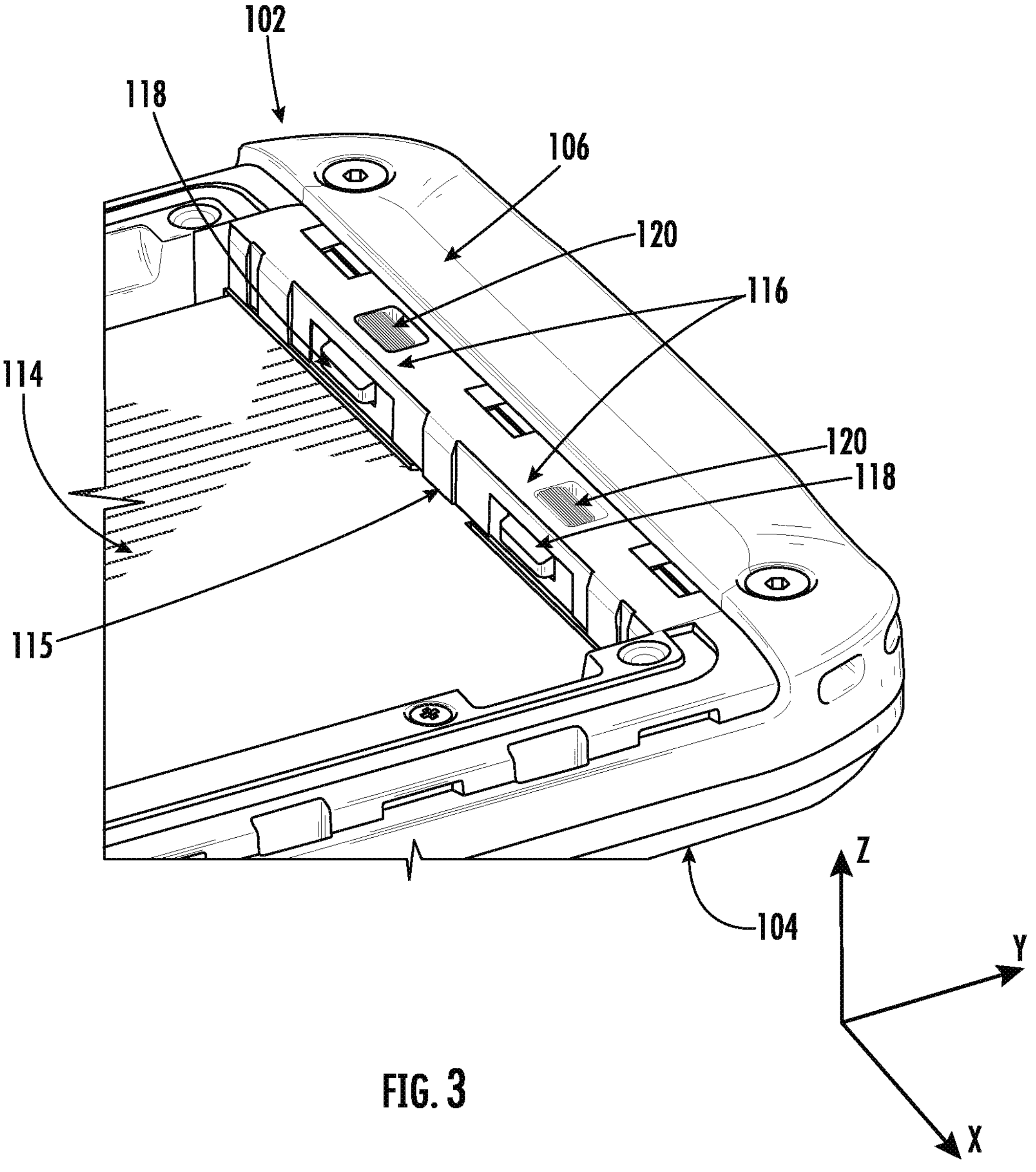
FIG. 3 illustrates a perspective view of a portion of the example mobile device of FIGS. 1A-1B including an example cavity and locking mechanism.

As shown in FIGS. 1B and 2B, the mobile device 100 may include a battery cover 108 that is removably attached to the body 102 of the mobile device 100 at the second surface 106. The battery cover 108 may be configured to attach to the second surface 106 of the body 102 so as to at least partially cover and/or enclose the cavity (e.g., cavity 114 in FIG. 3) of the body and, in operation, at least partially cover and/or enclose the battery (e.g., battery 300 in FIG. 4) received by the cavity. As described above, as an overall thickness 110 of the mobile device 100 is reduced to provide a thinner solution, the thickness 112 of the battery cover 108 may similarly be reduced (e.g., less than the thickness 212 of the battery cover 208 in FIG. 2A). Although reducing the size of the mobile device 100, this reduction is thickness 112 of the battery cover 108 may reduce the ability of the battery cover 108 alone to prevent ejection of the battery from the body 102. Although described hereinafter with reference to a mobile device 100 that may be configured for user with a battery such that the battery is removable from the mobile device 100, the present disclosure contemplates that the mobile device 100 may, in some embodiments, comprise the battery. Said differently, the mobile device 100 of the present disclosure may, in some embodiments, be provided as an integral device that includes the battery described hereafter.

As such, with reference to FIGS. 3-9, the mobile device 100 may include a locking mechanism 116 and cavity 114 configured to secure the battery 300 within the mobile device 100 and prevent unintended ejection of the battery 300. As shown, the body 102 may define a cavity 114 in the body 102 at the second surface 106 such that, in operation, a battery 300 may be received within the cavity 114. The cavity 114 may include any opening, recess, depression, etc. within which a battery 300 is placed so as to power (e.g., be in electrical communication with) one or more circuitry components or elements of the mobile device 100. The cavity 114 may be dimensioned (e.g., sized and shaped) based upon the corresponding dimensions of the battery 300. For example, the cavity 114 may define a rectangular cross-sectional shape so as to receive a battery 300 therein having a rectangular cross-sectional shape. Although illustrated and described herein with reference to a cavity 114 and battery 300 having a rectangular cross-sectional shape, the present disclosure contemplates that the cavity 114 and battery 300 may be dimensioned (e.g., sized and shaped) based upon the intended application of the mobile device 100. As described hereafter in conjunction with the locking mechanism 116 of the present disclosure, the cavity 114 may be dimensioned so as to limit movement of the battery 300 in a first plane (e.g., in the X-Y plane as labeled). The first plane may be substantially parallel with respect to the first surface 104 and/or the second surface 106. Said differently, the cavity 114 may be dimensioned so as to limit movement of the battery 300 in two directions (e.g., the labeled X direction and the labeled Y direction) within a plane that is substantially parallel with respect to the first surface 104 and/or the second surface 106. As described hereafter with reference to FIGS. 9A-9B, the cavity 114 may be configured to limit movement of the battery 300 in the first plane toward the latch 118 of the locking mechanism 116 to a second distance 402.

Figure 4:
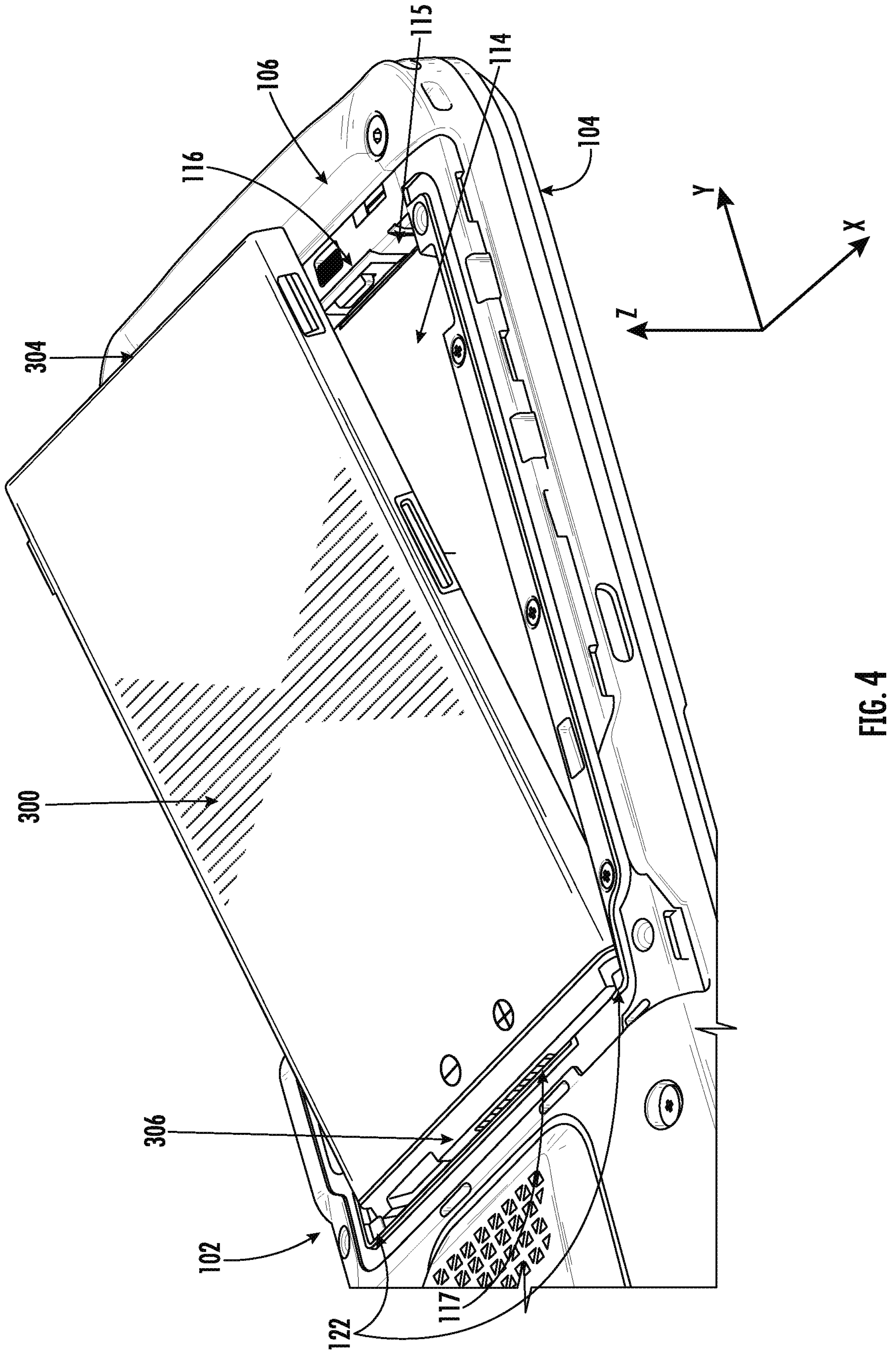
FIG. 4 illustrates a perspective view of a portion of the example mobile device of FIGS. 1A-1B in which an end of a battery is inserted into an example cavity of the mobile device.
Figure 5:
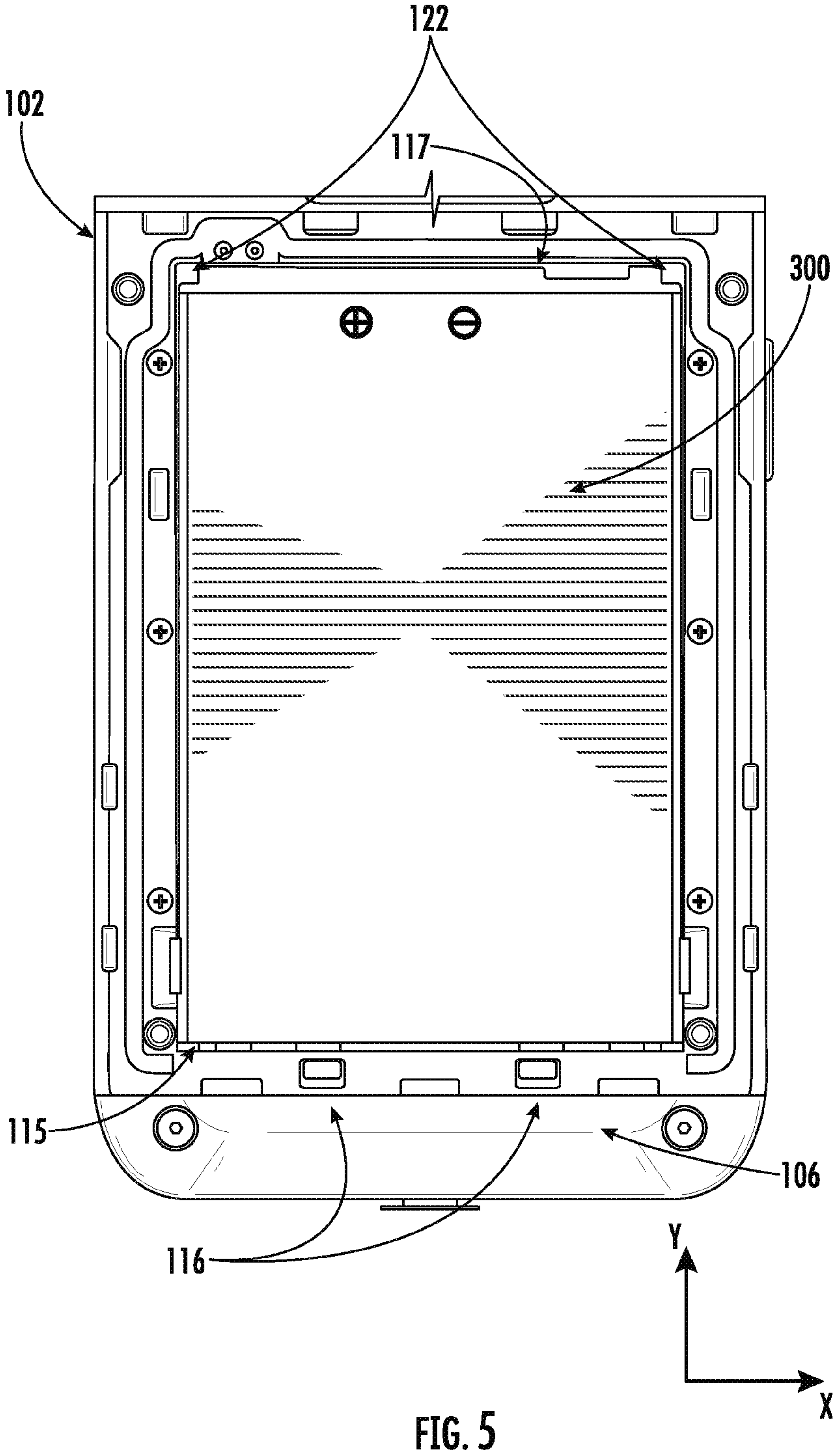
FIGS. 5-6 illustrate top views of the example mobile device of FIGS. 1A-1B with a battery received by the example cavity, according to an example embodiment.
Figure 6:
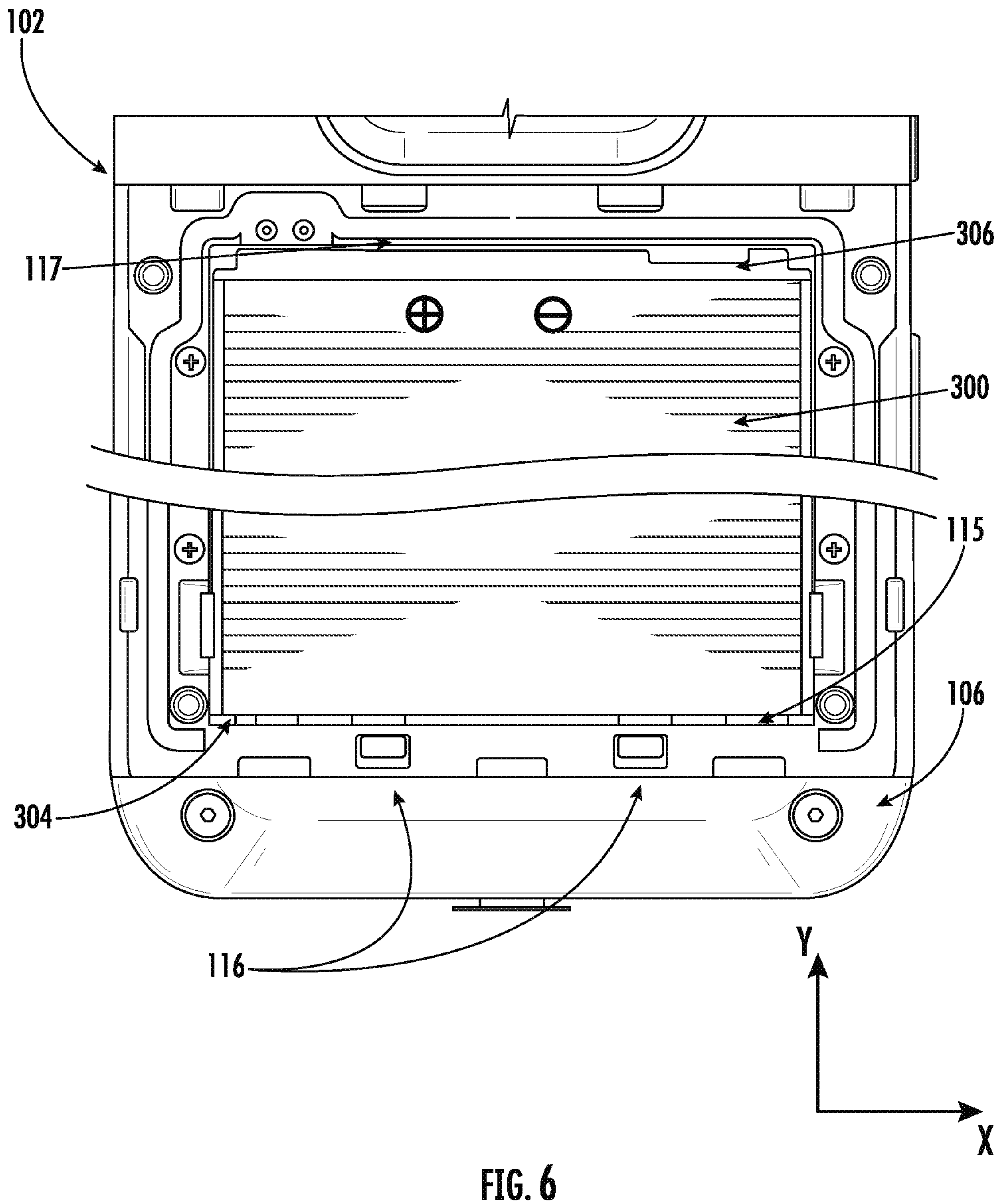

As shown in FIGS. 4-6, the cavity 114 may define a first end 115 configured to be disposed proximate a corresponding first end 304 of the battery 300 when the battery 300 is received by the cavity 114. The cavity 114 may further define a second end 117 opposite the first end 115 configured to be disposed proximate a corresponding second end 306 of the battery 300 when the battery 300 is received by the cavity 114. In operation, as shown in FIG. 4, the battery 300 may be inserted into the cavity 114 by first placing the second end 306 of the battery within the cavity 114 at the second end 117. In some embodiments, the second end 306 may define one or more extensions 122 configured to engage the second end 306 of the battery 300. By way of example, the extensions 122 may define a feature that extends at least partially into the cavity 114 so as to contact an exterior surface of the battery 300 at the second end 306 (e.g., a surface proximate the battery cover 108). In some instances, the extensions 122 may include a pair of extensions 122, each of which is positioned at an opposing end of the second end 117 (e.g., at a junction between the second end 117 and lateral sides of the cavity 114 that extend between the first end 115 and the second end 117) so as to engage corresponding corners of the second end 306 of the battery 300. Said differently, the extensions 122 at the first end 117 of the cavity 114 may allow the battery 300 to pivot about the second end 306 until the first end 304 is positioned proximate the first end 115 of the cavity 114. Although illustrated and described herein with reference to a pair of extensions 122, the present disclosure contemplates that any number of extensions 122 may be defined by the cavity 114 at the first end 117 or any other position of the cavity 114. By way of example, in some embodiments, the pair of extensions 122 may define a single extension that extends along the width (e.g., the labeled X direction) of the second end 117 of the cavity 114.

Figure 7:
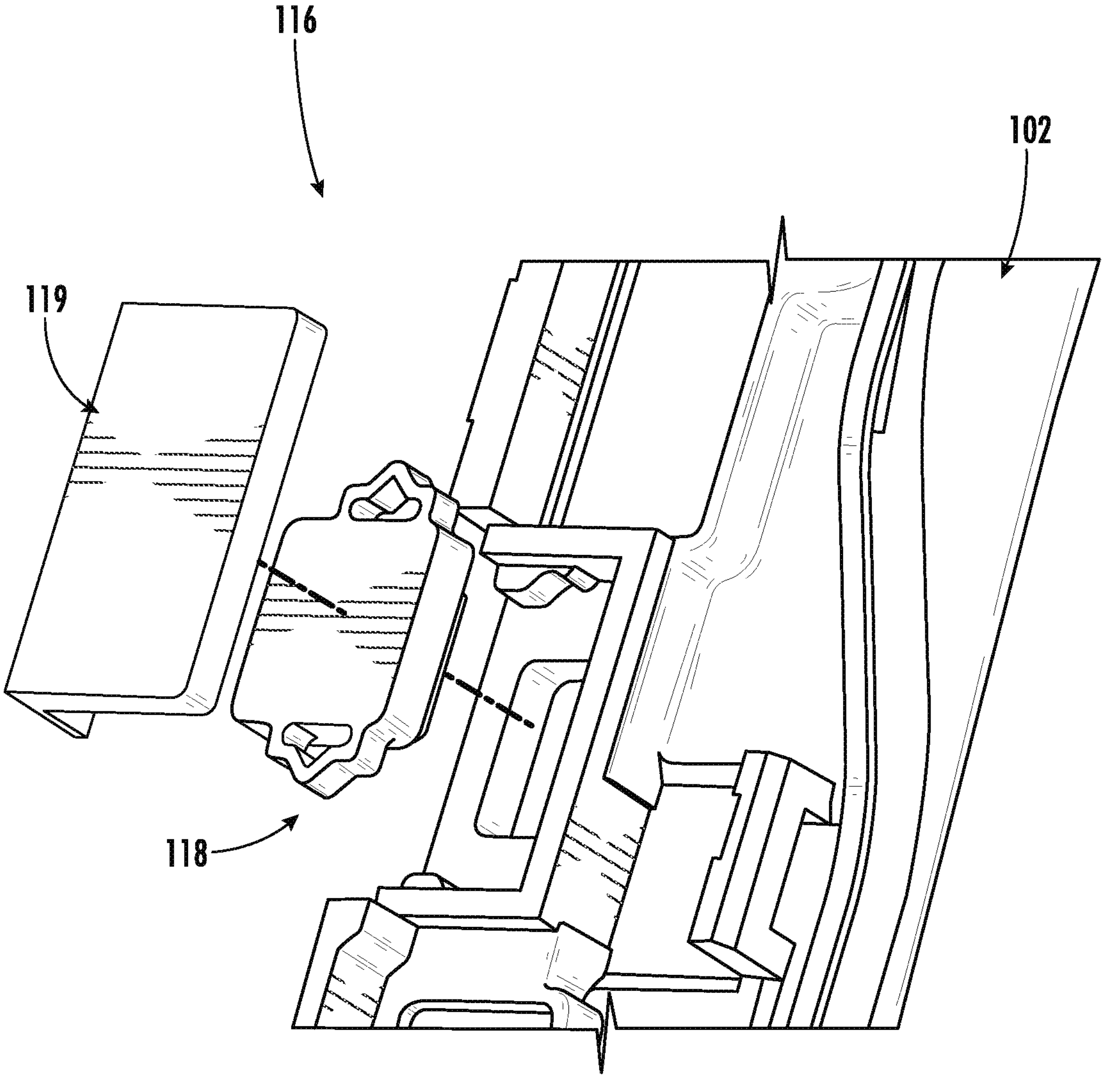
FIG. 7 illustrates an exploded view of an example locking mechanism according to an example embodiment.

With reference to FIGS. 7-9B, the mobile device 100 may further include a locking mechanism 116 configured to secure the battery 300 within the cavity 114 in an instance in which the battery 300 is received by the cavity 114. The locking mechanism 116 may, in some embodiments as shown in FIG. 7 include a latch 118 that may be attached to the body 102 of the mobile device 100 via a latch cover 119. As shown, the second surface 106 of the body 102 may, for example, define an opening within which the latch 118 of the locking mechanism 116 may be positioned at the first end 115 of the cavity 114. The latch cover 119 may be configured to support the latch 118 within the opening of the body 102 and allow movement of the locking mechanism 116 as described hereafter. The latch 118 may define an engagement portion 120 that may be positioned within the opening in order to receive an input from an operator associated with the mobile device 100 to cause movement of the locking mechanism 116 from an unlocked position to a locked position and/or from the locked position to the unlocked position. Accordingly, the engagement portion 120 of the latch 118 may define a textured surface (e.g., one or more raised portions, ribs, etc.) to allow an operator to translate the latch 118 of the locking mechanism 116 relative the body 102. As described hereafter, the cavity 114 and the locking mechanism 116 may be configured to prevent a contact between the battery 300 and the locking mechanism 116 that results in movement of the locking mechanism 116 from the locked position to the unlocked position.

Figure 8A:
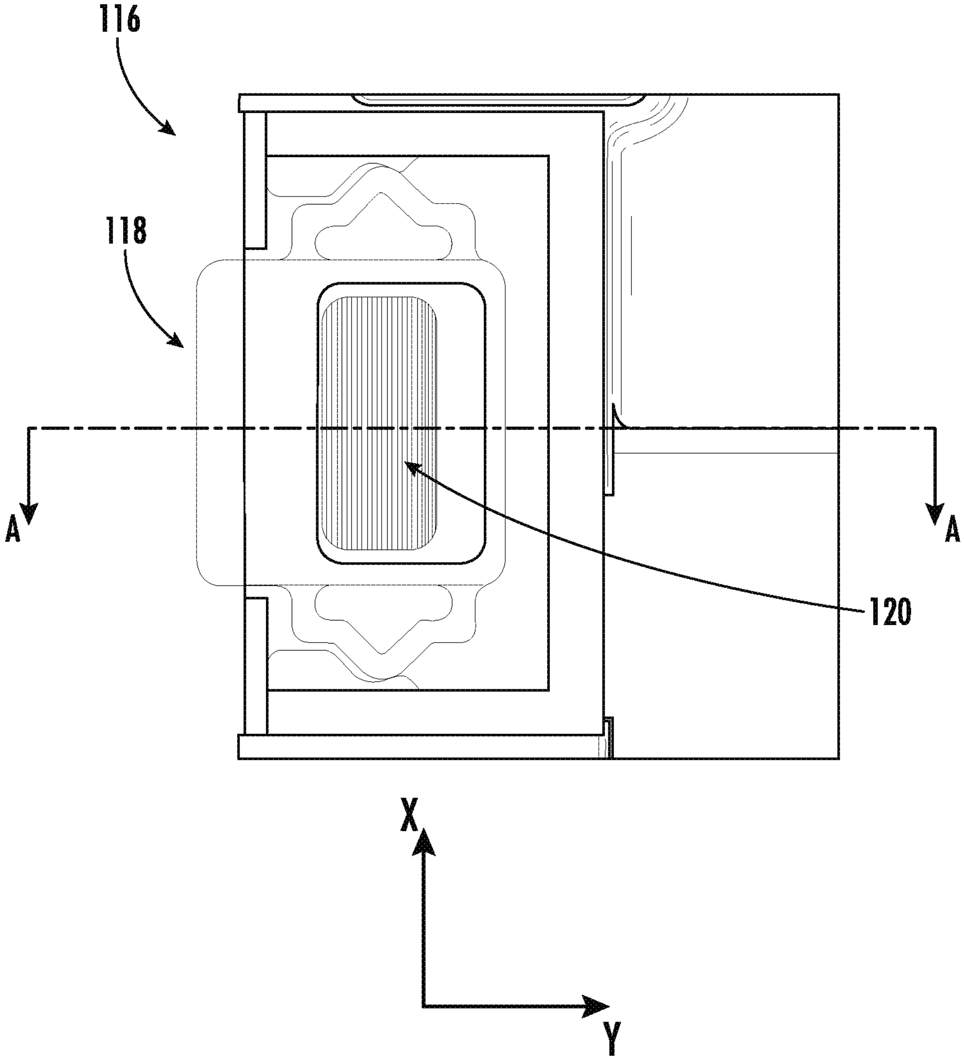
FIGS. 8A-8B illustrate top views of the locking mechanism of FIG. 7 in a locked and unlocked position, respectively, according to an example embodiment.
Figure 8B:
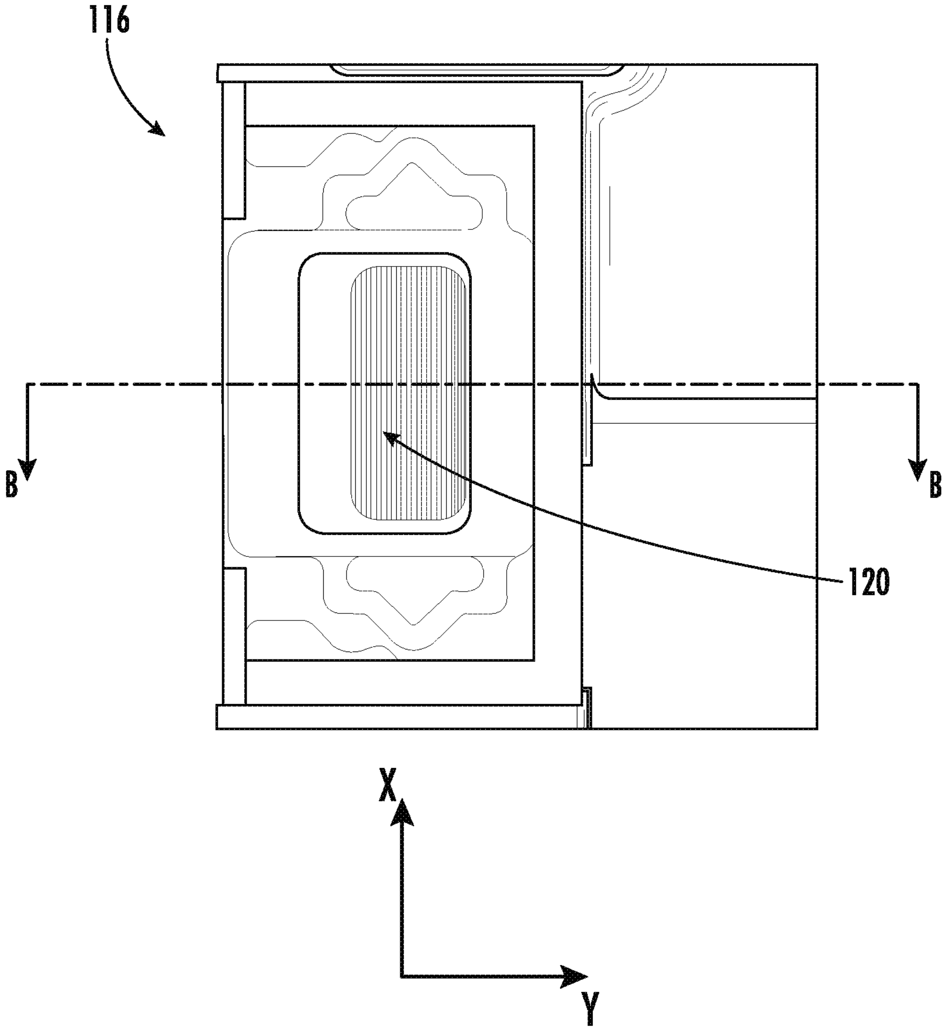
Figure 9A:
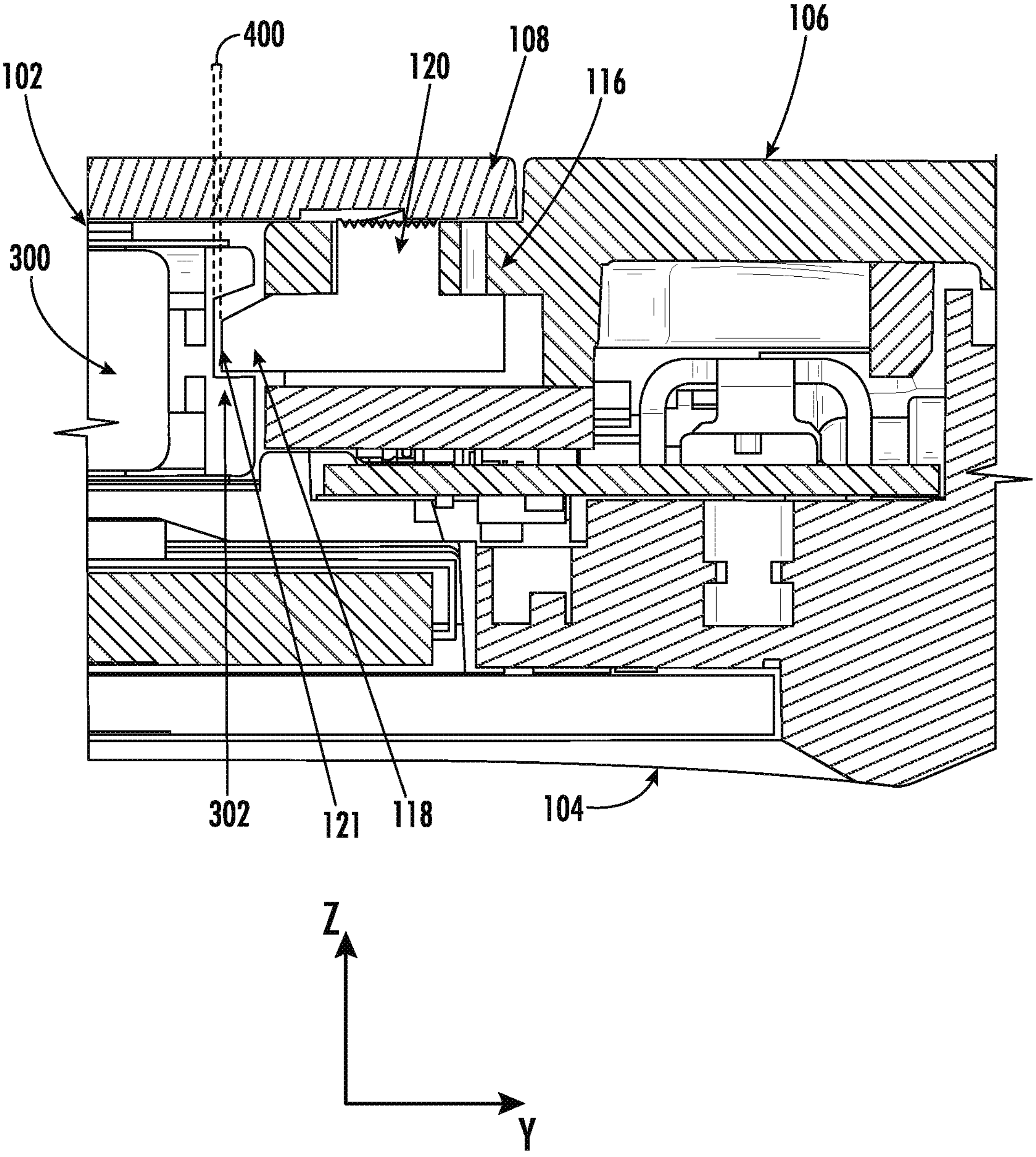
FIG. 9A illustrates a cross-sectional side view of the locking mechanism of FIG. 8A in the locked position along line A-A, according to an example embodiment.
Figure 9B:
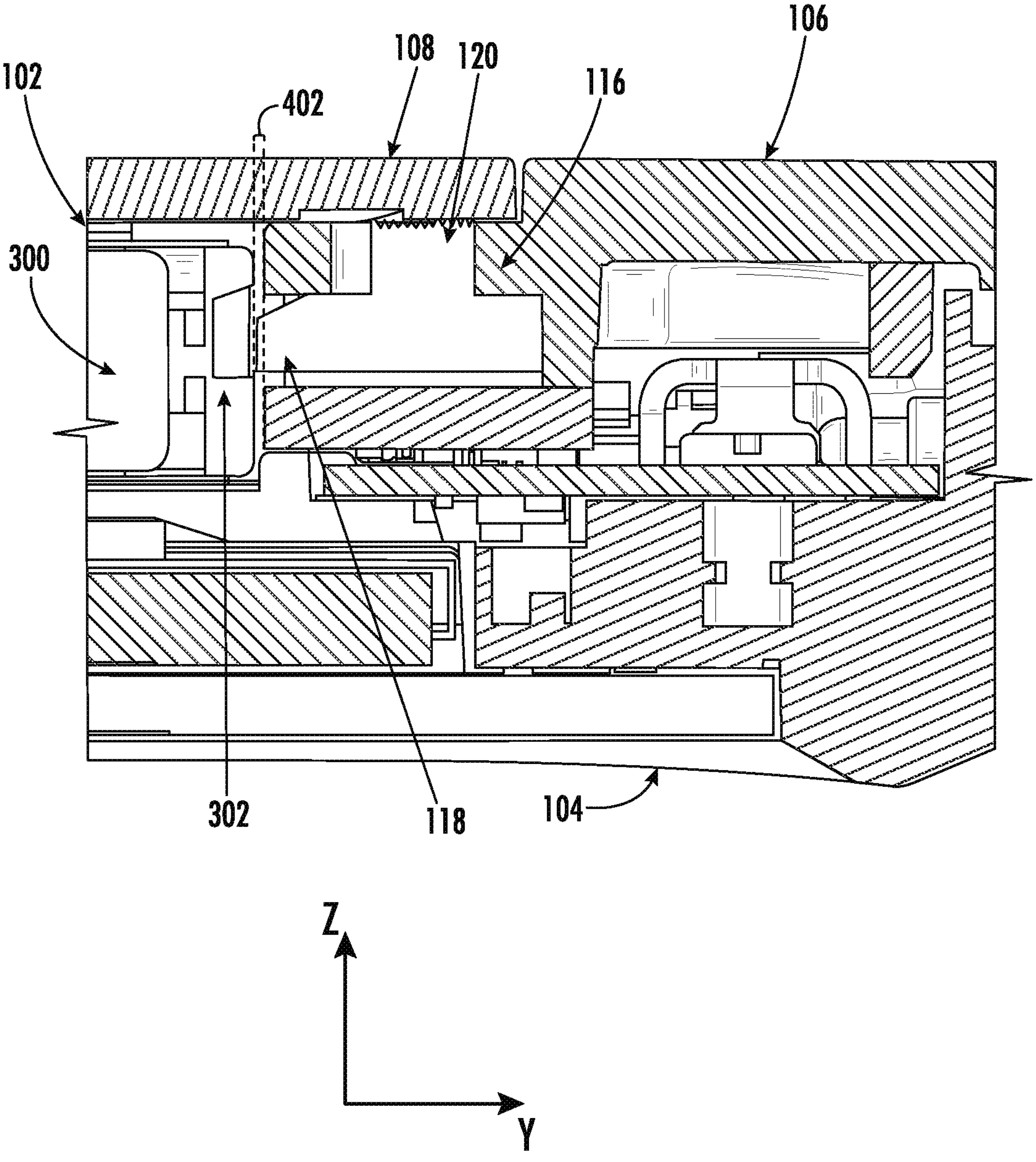
FIG. 9B illustrates a cross-sectional side view of the locking mechanism of FIG. 8B in the unlocked position along line B-B, according to an example embodiment.

With reference to FIGS. 8B and 9B, the locking mechanism 116 of the present disclosure is illustrated in an unlocked position at which the latch 118 is at least partially retracted from the cavity 114. As shown, the locking mechanism 116 may be configured such that the latch 118, in the unlocked position, is at least partially retracted from the first end 115 at which the locking mechanism 116 is supported, into the interior of the body 102. In the unlocked position, the battery 300 may be removed from the cavity 114 (e.g., the locking mechanism 116 does not impede movement of the battery 300 in the labeled Z direction). Similarly, in the unlocked position, the battery 300 may be placed within the cavity 114 without impinging upon the latch 118 of the locking mechanism 116 (e.g., the first end 304 of the battery may be placed within the cavity 114 without impinging upon the latch 118).

With reference to FIGS. 8A and 9A, the locking mechanism 116 of the present disclosure is illustrated in a locked position at which the latch 118 projects at least partially into the cavity 114. As described above, the latch 118 may define an engagement portion 120 configured to receive an operator input that causes the latch 118 to translate relative the body 102 so as to move between the unlocked position and the locked position. In moving to the locked position, at least a portion of the latch 118 that was previously supported within the body 102 may extend or otherwise project from the interior of the body 102 into the open space of the cavity 114. In order to engage the battery 300, the battery 300 may define a notch 302 at the first end 304 of the battery 300. By way of example, the notch 302 may define a recess, indention, and/or the like that may, in some embodiments, extend along a width (e.g., in the labeled X direction) of the first end 304 of the battery 300. The notch 302 may be dimensioned (e.g., sized and shaped) based upon the corresponding dimensions (e.g., size and shape) of the latch 118 received therein. In some embodiments, the locking mechanism 116 may include a pair of latches 118 supported by the first end 115 of the cavity 114 that may independently or collectively move between the locked position and the unlocked position so as to independently or collectively engage the battery 300. In such an embodiment, the pair of latches 118 may include respective latch covers 119 that attached the respective latches 118 to the body 102 proximate the first end 115 of the cavity 114. Although illustrated with a locking mechanism 116 having a pair of latches 118, the present disclosure contemplates that the locking mechanism 116 may include any number of latches at any position on the body 102 based upon the intended application of the mobile device 100.

As shown in FIG. 9B and as described above, the cavity 114 may be dimensioned so as to limit movement of the battery 300 in a first plane (e.g., in the X-Y plane as labeled). The first plane may be substantially parallel with respect to the first surface 104 and/or the second surface 106. Said differently, the cavity 114 may be dimensioned so as to limit movement of the battery 300 in two directions (e.g., the labeled X direction and the labeled Y direction) within a plane that is substantially parallel with respect to the first surface 104 and/or the second surface 106. For example, the cavity 114 may be configured to limit movement of the battery 300 in such a first plane (e.g., the X-Y plane) toward the latch 118 of the locking mechanism 116 to a second distance 402. In other words, the dimensions of the cavity 114 in the first plane (e.g., the X-Y plane) may be determined based upon the associated dimensions of the battery 300 such that the battery may move only a second distance 402 in the labeled Y direction towards the latch 118 of the locking mechanism 116. By way of a non-limiting example, the second distance 402 may be approximately 0.05 mm (e.g., a 0.05 mm gap between the battery 300 and the cavity 114 in the Y direction).

As shown in FIG. 9A, the latch 118 of the locking mechanism 116 in the locked position may, in an instance in which the battery 300 is positioned within the cavity 114, be received by the notch 302 of the battery 300. As shown, the latch 118 may, in the locked position, project from the body 102 (e.g., the first end 115 of the cavity 114) into the cavity 114 and into the notch 302 defined by the battery 300 such that an end 121 of the latch 118 is disposed proximate the battery 300. As shown, the latch 118 may be configured to limit movement of the battery 300 in a second plane (e.g., a plane in the labeled Z direction), wherein the second plane is substantially perpendicular with respect to the first plane (e.g., substantially perpendicular to a plane in the labeled X-Y directions) and/or substantially perpendicular with respect to the first surface 104 and/or the second surface 106 of the body 102. As the dimensions of the cavity 114 operate to limit movement of the battery 300 within the cavity 114 in the labeled X and Y directions, the latch 118 of the locking mechanism 116 may operate to limit movement of the battery 300 in the labeled Z direction (e.g., a movement of the battery out of the cavity 114). For example, in an instance in which the locking mechanism 116 is in the locked position in which the latch 118 projects at least partially into the notch 302 of the battery 300, an attempted movement of the battery 300 in the labeled Z direction (e.g., in the second plane) results in impingement of the battery 300 (e.g., a surface of the notch 302) on at least a portion of the latch 118. In this way, the locking mechanism 116 operates to secure the battery 300 (e.g., in conjunction with the cavity 114) within the mobile device 100.

With continued reference to FIG. 9A, in the locked position, the latch 118 of the locking mechanism 116 may be configured project in the first plane (e.g., in the labeled Y direction towards the battery 300) into the corresponding notch 302 of the battery 300 such that a first distance 400 is defined between an end 121 of the latch 118 and the battery 300 in the first plane. As described above, the mobile device 100 of the present disclosure may be deployed in a variety of environments in which the mobile device 100 may be mishandled, dropped, or otherwise subjected to increased forces (e.g., forces imparted on the mobile device 100 that cause movement of the battery 300 within the cavity 114). By way of example, the mobile device 100 may be dropped by an operator resulting in movement of the battery 300. In traditional designs, this movement of the battery often results in ejection of the battery from the mobile device. In order to prevent this unintended ejection of the battery 300, the mobile device 100 of the present disclosure may utilize the above-described cavity 114 and locking mechanism 116 to prevent a contact between the battery 300 and the locking mechanism 116 that results in movement of the locking mechanism 116 from the locked position to the unlocked position.

As described above, the dimensions of the cavity 114 in the first plane (e.g., the X-Y plane) may be determined based upon the associated dimensions of the battery 300 such that the battery 300 may move only a second distance 402 in the labeled Y direction towards the latch 118 of the locking mechanism. The latch 118 of the locking mechanism 116 may be configured to project in the first plane (e.g., in the labeled Y direction towards the battery 300) into the corresponding notch 302 of the battery 300 such that a first distance 400 is defined between an end 121 of the latch 118 and the battery 300 in the first plane. In order to prevent unintended ejection of the battery 300, the second distance 402 may be less than the first distance 400. By way of continued example, the second distance 402 may be approximately 0.05 mm (e.g., a 0.05 mm gap between the battery 300 and the cavity 114 in the Y direction), and the first distance 400 may be approximately 0.30 mm (e.g., 0.05 mm is less than 0.30 mm). In this way, movement of the battery 300 within the cavity 114 in a direction (e.g., the labeled Y direction) towards the locking mechanism 116 is limited to a distance (e.g., the second distance 402) that is less than the distance (e.g., the first distance 400) between the end 121 of the latch 118 of the locking mechanism 116 and the battery 300. Said differently, movement of the battery 300 towards the latch 118 that would contact the latch 118 may operate to cause the locking mechanism 116 to move from the locked position to the unlocked position. As such, the cavity 114 and locking mechanism 116 of the present disclosure is configured to prevent such a contact as described above.

Method of Assembling/Manufacturing

Figure 10:
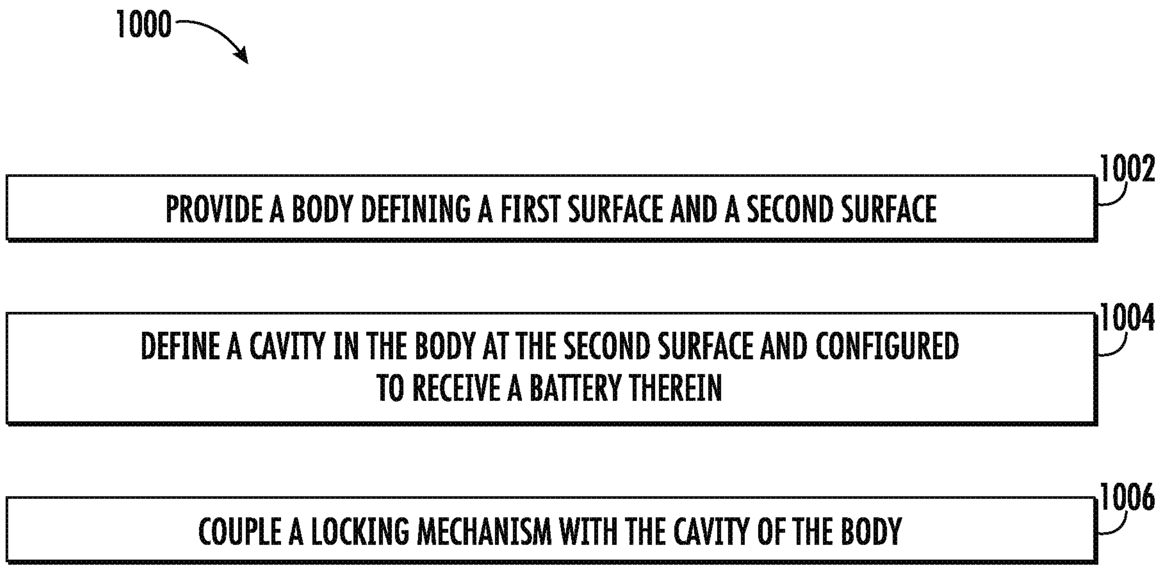
FIG. 10 illustrates an example method of assembling/manufacturing an example mobile device of the present disclosure.

With reference to FIG. 10, an example method of assembling/manufacturing a mobile device (e.g., method 1000) is illustrated. As shown in operation 1002, the method 1000 may include providing a body defining a first surface and a second surface. As described above, the mobile device may include a body, a first surface, and a second surface opposite the first surface. The body may support various circuitry components, such as processors, speakers, cameras, scanners, and/or the like based upon the intended application of the mobile device. Said differently, the mobile device may be configured for use in any industry, environment, or application without limitation and may include any number of associated components, elements, computing devices, processors, etc. in order to perform the operations associated with the associated industry, environment, or application. As such, the first surface may include one or more input elements (not shown), such as buttons, knobs, dials, touch screen features, or the like, to allow interaction with the mobile device by an operator. Operation 1002 may further include, in some embodiments, providing a battery cover that is removably attached to the body of the mobile device at the second surface. The battery cover may be configured to attach to the second surface of the body so as to at least partially cover and/or enclose the cavity defined hereafter of the body and, in operation, at least partially cover and/or enclose the battery received by the cavity.

At operation 1004, the method 1000 may include defining a cavity in the body at the second surface and configured to receive a battery therein. As described above, the body may define a cavity in the body at the second surface such that, in operation, a battery may be received within the cavity. The cavity may include any opening, recess, depression, etc. within which a battery is placed so as to power (e.g., be in electrical communication with) one or more circuitry components or elements of the mobile device. The cavity may be dimensioned (e.g., sized and shaped) based upon the corresponding dimensions of the battery. For example, the cavity may define a rectangular cross-sectional shape so as to receive a battery therein having a rectangular cross-sectional shape. Although illustrated and described herein with reference to a cavity and battery having a rectangular cross-sectional shape, the present disclosure contemplates that defining the cavity at operation 1004 may include dimensioning (e.g., sizing and shaping) the cavity based upon the intended application of the mobile device. As described hereafter in conjunction with the locking mechanism of the present disclosure, the cavity may be dimensioned so as to limit movement of the battery in a first plane (e.g., in the X-Y plane as labeled). The first plane may be substantially parallel with respect to the first surface and/or the second surface. Said differently, the cavity may be dimensioned so as to limit movement of the battery in two directions (e.g., the labeled X direction and the labeled Y direction) within a plane that is substantially parallel with respect to the first surface and/or the second surface.

At operation 1006, the method 1000 may include coupling a locking mechanism with the cavity of the body. As described above, the mobile device may further include a locking mechanism configured to secure the battery within the cavity in an instance in which the battery is received by the cavity. The locking mechanism may include a latch that may be attached to the body of the mobile device via a latch cover. The second surface of the body may, for example, define an opening within which the latch of the locking mechanism may be positioned at the first end of the cavity. The latch cover may be configured to support the latch within the opening of the body and allow movement of the locking from an unlocked position to a locked position and/or from the locked position to the unlocked position. Accordingly, an engagement portion of the latch may define a textured surface (e.g., one or more raised portions, ribs, etc.) to allow an operator to translate the latch of the locking mechanism relative the body.

The locking mechanism may be configured such that, in the locked position, the latch projects at least partially into the cavity. In moving to the locked position, at least a portion of the latch that was previously supported within the body may extend or otherwise project from the interior of the body into the open space of the cavity. In order to engage the battery, the battery may define a notch at the first end of the battery. The notch may be dimensioned (e.g., sized and shaped) based upon the corresponding dimensions (e.g., size and shape) of the latch received therein. The latch of the locking mechanism may be configured to limit movement of the battery in a second plane (e.g., a plane in the labeled Z direction), wherein the second plane is substantially perpendicular with respect to the first plane (e.g., substantially perpendicular to a plane in the labeled X-Y directions) and/or substantially perpendicular with respect to the first surface and/or the second surface of the body. As the dimensions of the cavity operate to limit movement of the battery within the cavity in the labeled X and Y directions, the latch of the locking mechanism may operate to limit movement of the battery in the labeled Z direction (e.g., a movement of the battery out of the cavity 114). Defining the cavity at operation 1004 and coupling the locking mechanism at operation 1006 may include defining dimensions of the cavity in the first plane (e.g., the X-Y plane) such that the battery may move only a second distance in the labeled Y direction towards the latch of the locking mechanism. The latch of the locking mechanism may be configured project in the first plane (e.g., in the labeled Y direction towards the battery) into the corresponding notch of the battery such that a first distance is defined between an end of the latch and the battery in the first plane. In order to prevent unintended ejection of the battery 300, the second distance may be less than the first distance.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mobile device comprising:
- a body, the body defining:
  - a first surface;
  - a second surface opposite the first surface; and
  - a cavity defined in the body at the second surface and configured to receive a battery therein, wherein the cavity comprises a first end and a second end;
- a locking mechanism coupled with the cavity of the body, wherein the locking mechanism comprises a latch configured to move between an unlocked position and a locked position, wherein the cavity is dimensioned to enable a movement of the battery in the cavity to the latch within a second distance,
- wherein a first distance between an end of the latch in the locked position and an edge of the battery proximal to the end of the latch is greater than the second distance to prevent the movement of the battery from causing the locking mechanism to move from the locked position to the unlocked position.

2. The mobile device according to claim 1, wherein the latch is configured to translate relative to the body from the locked position at which the latch projects at least partially into the cavity and the unlocked position at which the latch is at least partially retracted from the cavity.

3. The mobile device according to claim 1, wherein the cavity is dimensioned to limit movement of the battery in a first plane, wherein the first plane is substantially parallel with respect to at least one of the first surface or the second surface of the body.

4. The mobile device according to claim 3, wherein, in the locked position, the latch is configured to limit movement of the battery in a second plane, wherein the second plane is substantially perpendicular with respect to the first plane.

5. The mobile device according to claim 3, wherein, in the locked position, the latch is configured to project in the first plane into a corresponding notch of the battery such that the first distance is defined between the end of the latch and the battery in the first plane.

6. The mobile device according to claim 1, further comprising a battery cover removably attached to the second surface of the body and configured to cover the cavity.

7. The mobile device according to claim 1, wherein the first end supports the locking mechanism such that, in the locked position and in an instance in which the battery is received by the cavity, the locking mechanism engages a corresponding first end of the battery.

8. The mobile device according to claim 7, wherein the second end is opposite to the first end and defines one or more extensions configured to, in the instance in which the battery is received by the cavity, engage a second end of the battery opposite the first end of the battery.

9. The mobile device according to claim 7, wherein the locking mechanism further comprises a pair of latches supported by the first end of the cavity and configured to, in the locked position, collectively engage a corresponding notch defined by the battery.

10. A method of manufacturing a mobile device, the method comprising:
- providing a body, the body defining:
  - a first surface; and
  - a second surface opposite the first surface;
- defining a cavity in the body at the second surface and configured to receive a battery therein, wherein the cavity comprises a first end and a second end; and
- coupling a locking mechanism with the cavity of the body, wherein the locking mechanism comprises a latch configured to move between an unlocked position and a locked position, wherein the cavity is dimensioned to enable a movement of the battery in the cavity to the latch within a second distance,
- wherein a first distance between an end of the latch in the locked position and an edge of the battery proximal to the end of the latch is greater than the second distance to prevent the movement of the battery from causing the locking mechanism to move from the locked position to the unlocked position.

* * * * *